March 31, 1959 D. O. GALLENTINE 2,880,409
SHAFT POSITION TRANSDUCER
Filed Nov. 9, 1955 2 Sheets-Sheet 1

INVENTOR
DONAL O. GALLENTINE
BY Hyman Hurwitz
ATTORNEY

March 31, 1959  D. O. GALLENTINE  2,880,409
SHAFT POSITION TRANSDUCER
Filed Nov. 9, 1955  2 Sheets-Sheet 2
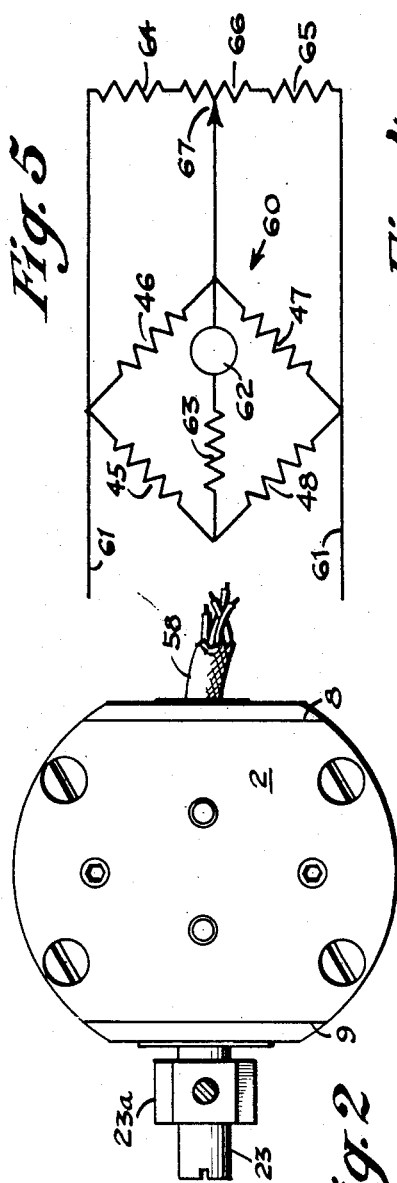
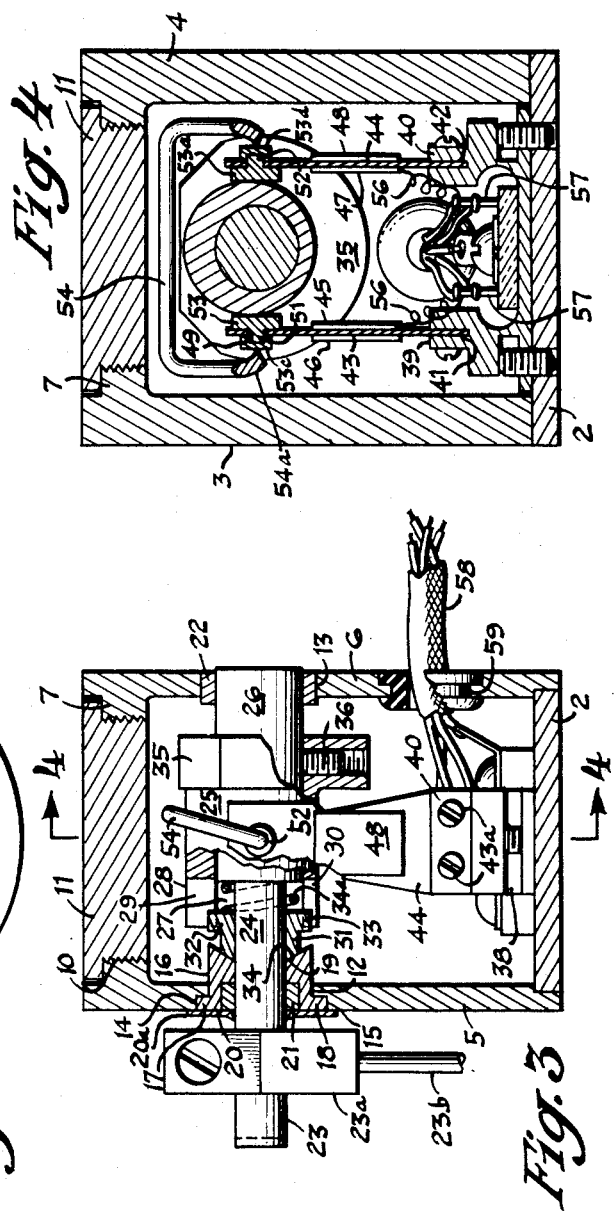
INVENTOR
DONAL O. GALLENTINE
BY Hyman Hurvitz
ATTORNEY

United States Patent Office 2,880,409
Patented Mar. 31, 1959

2,880,409

SHAFT POSITION TRANSDUCER

Donal O. Gallentine, Eau Gallie, Fla.

Application November 9, 1955, Serial No. 545,908

2 Claims. (Cl. 340—345)

The present invention relates generally to shaft position transducers and in particular to a temperature compensated shaft position transducer employing resistance strain gages.

Briefly describing the present invention a cylindrical shaft is rotatably mounted in a transducer housing and is adapted to be rotated by any rotatable device, the direction and degree of rotation of which are to be measured. The cylindrical shaft includes a cylindrical cam having an axis of rotation which is offset from, but extends parallel with, the axis of the cylindrical shaft. A reference position for the cylindrical shaft may be established by a detent arrangement. The axis of the cam is displaced in a first coordinate direction with respect to the axis of the cylindrical shaft, when the cylindrical shaft assumes its reference position. Two cantilever beams are disposed on opposite sides of the cam, for actuation thereby, the beams extending substantially in parallel planes, and being fixedly supported at the ends of the beams which subsist relatively remotely of the cam. The ends of the cantilever beams which are adjacent to the cam bear against the cam on lines lying in a plane perpendicular to the first coordinate direction, and passing through the axis of the cam, while the rotatable element is in its reference position. In consequence of this arrangement the cantilever beams contact the cam at points having equal displacements from the axis of the cam, and from the axis of the cylindrical shaft. A U-shaped spring is provided, which engages the outward faces of the cantilever beams, pressing the beams together so that lines extending transversely of the inward faces of the cam are continually maintained in contact with the cam. The points of contact between the spring and the beams lie in a second plane parallel to the first plane, and selection of the location of the second plane in the first coordinate direction is an important factor in establishing accurate operation of transducers arranged in accordance with the present invention. Should the second plane lie above or below the axis of the cam, the beams would be pre-stressed by torque developed by the force exerted by the spring acting through a lever arm equal to the displacement in the first coordinate direction of the second plane from the axis of the cam. Changes in the temperature of the spring produce variations in the force it applies to the beams thereby introducing uncompensated stresses therein which vary independently of shaft position. This pre-stresssing of the beams could be eliminated, while the shaft is in its reference position, by locating the second plane so that it passes through the axis of the cam, and therefore through the points of contact of the beams and the cam. However, as the shaft is rotated, and the axis of the cam thereby also rotated, about the axis of the shaft, the plane through the points of contact would no longer pass through the axis of the cam and the lever arm is established having a length which is a function of the angle of rotation of the shaft. The maximum lever arm is developed when the shaft is rotated 180 degrees, and is equal to the diameter of the circle described by rotation of the axis of the cam about the axis of the shaft.

In accordance with the present invention a maximum lever arm equal to the radius of the circle described by rotation of the axis of the cam about the axis of the shaft is obtained by passing the plane of the points of contact between the spring and the beams through the axis of the cylindrical shaft. The lever arm tending to produce pre-stressing of the beams when the cylindrical shaft is in its reference position is equal to the displacement of the axis of the cam from the axis of the shaft. The lever arm thus provided is the maximum lever arm regardless of the degree of rotation of the shaft, the lever arm becoming zero when the shaft is rotated through 90 degrees, the axis of the cam then being located in the plane of the points of contact between the spring and the beams.

Two electrical strain gages are mounted on each of the beams, the gages measuring the degree of bending of the beams produced by rotation of the cam. The four gages are arranged as the four arms of a resistance bridge, a meter being disposed across the conjugate terminals of the bridge to measure its output voltage. By proper disposition of the gages in the resistance bridge each of the beams may be temperature compensated. The negligible pre-stressing of the beams, provided in accordance with the present invention together with temperature compensation of the beams enables construction of shaft position transducers substantially insensitive to temperature variations of its several components.

The detents employed for determining a reference position for the cylindrical shaft comprise a tubular female detent and a tubular male detent. The female detent is disposed about the cylindrical shaft and is secured to the transducer housing. The male detent is also disposed about the cylindrical shaft and is coupled to the cam for rotation therewith. The female and male detents have mating V-shaped members, the male detent being spring biased into engagement with the female detent by a compression spring. Upon rotation of the shaft, the V-shaped member of the male detent becomes unseated from the V-shaped member of the female detent and the male detent slides axially along the shaft, further compressing the compression spring and thereby developing a radial force between the V-shaped members tending to return the male detent and therefore the shaft to its reference position.

It is an object of the present invention to provide a temperature compensated shaft position transducer.

It is another object of the present invention to provide a linear, temperature compensated shaft position transducer employing electrical resistance strain gages.

Another object of the present invention is to provide a shaft position transducer employing two cantilever beams for measuring the rotation of a cylindrical cam of a rotatable cylindrical shaft wherein the beams are subjected to minimum pre-stressing.

It is another object of the present invention to provide a shaft position transducer employing two cantilever beams for measuring the rotation of a cylindrical cam of a rotatable cylindrical shaft, a spring for applying a force to each of the beams for maintaining them in contact with the cam, the forces applied by the spring to the beams being directed along an axis passing through the axis of the cylindrical shaft and perpendicular to the plane of displacement of the axis of the cam from the axis of the cylindrical shaft when the cylindrical shaft is in a reference position.

Still another object of the present invention is to provide a shaft position transducer employing two cantilever beams for measuring rotation of a cam of a cylindrical shaft, and a spring for maintaining the beams in contact with the cam, wherein the spring is disposed so as to minimize pre-stressing of the beams and wherein each beam is provided with two electrical strain gages, the four gages being arranged as a resistance bridge and being so disposed in the bridge as to provide a temperature compensation of the system.

Yet another object of the present invention is to provide a shaft position transducer employing a rotatable shaft and employing a male and female detent for establishing a reference position for the shaft and for returning the shaft to the reference position when rotational forces are removed from the shaft.

The above and still further features, objects, and advantages of the invention will become apparent upon consideration of the following detailed description of a specific embodiment of the invention, especially when taken in conjunction with the accompanying drawings, wherein:

Figure 2 is a bottom view of the shaft position transducer.

Figure 3 is a side cross section view taken through the center of the shaft position transducer.

Figure 4 is a front cross section view taken through the center of the shaft position transducer.

Figure 5 is a schematic wiring diagram of the measuring circuit employed in the present invention.

Figure 1:
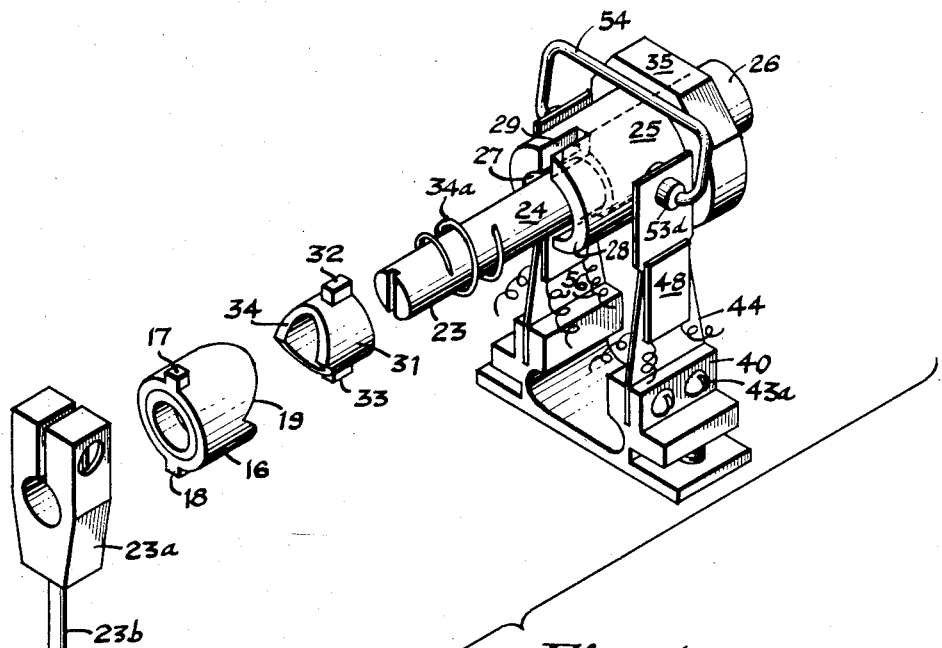
Figure 1 is a perspective view of the essential elements of the shaft position transducer of the present invention.

Referring now more particularly to Figures 1 to 4 inclusive, of the accompanying drawings, the shaft position transducer comprises a housing 1, having a bottom wall 2, two arcuate side walls 3 and 4. two flat end walls 5 and 6 and a top wall 7. The bottom wall 2 is a circular disc having segments removed from diametrically opposite sections of the disc to provide two straight and parallel edges 8 and 9. End walls 5 and 6 extend upwardly from the edges 8 and 9 and cooperate with side walls 3 and 4, which extend upwardly from the arcuate edges of the bottom wall 2, to provide a four sided housing 1. The top wall 7 has a large threaded aperture 10, extending vertically therethrough, a threaded cap 11 being provided to close the aperture 10 when the transducer is in use. The members 2—7 of the housing 1 may be fabricated as a single unit, or each of the members 2—7 may be fabricated independently, and thereafter assembled as by bolting the various members together.

The end walls 5 and 6 are provided with equal diameter circular apertures, 12 and 13, having a common axis equidistant from end walls 3 and 4. Two grooves 14 and 15 formed in the outer surface of the wall 5 extend radially outward from diametrically opposed edges of the aperture 12. A tubular female detent 16 is pressed into the aperture 12 with one end extending into the housing 1 by a predetermined distance and the other end being flush with the outer surface of the wall 5. The end of the tubular detent 16 extending into the housing 1 has formed therein a V-shaped groove 19, the base of the groove 19 illustrated as lying in a horizontal plane for the purpose of explanation only. The end of the detent 16 flush with wall 5 is provided with diametrically-opposed shoulders 17 and 18 extending radially from its outer circumference into the grooves 13 and 14 in wall 5, thereby radially locating the base of the V-shaped groove 19 in the horizontal plane. The inner surface of the tubular detent 16 is provided adjacent the wall 5 with a circumferential groove 20, in which is disposed a bushing 21 having approximately the same inner diameter as detent 16.

The aperture 13 in end wall 6 is provided with a bushing 22. An elongated shaft 23 having two cylindrical sections 24 and 26 extends between walls 5 and 6 and is rotatably mounted in the bushings 21 and 22 in the apertures 12 and 13. A first section 24 of the shaft 23 extends from externally of the housing 1, through the tubular detent 16, and internally of the housing 1 for a predetermined distance past the end of detent 16, the bushing 21 providing a low friction surface during rotation of the shaft 23. A second section 26 of the shaft 23 extends from the termination of section 24 of the shaft 23 through a hollow cylindrical cam 25 and the bushing 22, terminating flush with the outer surface wall 6. The cam 25 is disposed adjacent the juncture of the sections 24 and 26 internally of the housing 1 and is secured to the section 26 by a set screw 36 extending through a collar 35 into engagement with section 26, the collar 35 being an extension of the cam 25. The sections 24 and 26 are coaxial while the cam 25 has its axis offset from the axis of sections 24 and 26. A circular aperture 27, coaxial of the section 24, extends into the cam 25 from adjacent the end of the section 24, the inner diameter of the aperture 27 being equal to the diameter of section 24. The aperture 27 defines an axially extending, circumferential flange 28 surrounding a portion of the section 24, the flange 28 being provided with two axially-extending diametrically-opposed slots 29 and 30. A tubular male detent 31 is disposed about the section 24 of the shaft 23 between the female detent 16 and the cam 25. A section of the male detent 31 adjacent cam 25 is disposed radially between the flange 28 and the section 24 and has two diametrically opposed shoulders 32 and 33 which seat in the slots 29 and 30 in flange 28. Thus the male detent may slide axially along section 24 of the shaft 23 but its radial movement is restrained to coincide with the movement of the cam 25 as a result of the disposition of the shoulders 32 and 33 in the slots 29 and 30. The end of the male detent 31 adjacent the female detent 16 has a V-shaped axial extension 34 that seats in the V-shaped groove 19 in the female detent 16. A compression spring 34a is disposed about the section 24 in the aperture 27 and situated between the male detent 31 and the cam 25 and presses the male detent 31 into engagement with female detent 16.

The male and female detents 16 and 31 establish a reference position for shaft 23 and are so arranged that the axis of the cylindrical cam 25 is disposed vertically above the axis of the sections 24 and 26 of the shaft 23 when the male detent 31 is seated in female detent 16. When the shaft 23 is rotated and V-shaped projection 34 of male detent 31 is rotated with respect to the V-shaped groove 19 in female detent 16, the male detent moves to the right as seen in Figure 3, compressing the spring 34a. A radial force is developed, between the surfaces of the V-groove 19 and V-extension 34, proportional to the degree of rotation of the cam 25, which force returns the shaft 23 to its reference position when the force rotating the shaft 23 is removed.

Longitudinal movement of the shaft 23 is prevented in one direction by the cooperation between the male and female detents 16 and 31 and in the other direction by a snap ring 20a positioned about the shaft 23 and located adjacent to and external from the bushing 21. Rotation is imparted to the shaft 23 through rotation of a split collar 23a, secured to the section 24 externally of the housing 1, by means of a link 23b secured to the collar 23a.

Secured to the inner surface of the bottom wall 2 is a base member 38 having two vertical extensions 39 and 40 elongated parallel to the axis of the shaft 23. The extensions 39 and 40 are spaced apart and aligned along an axis transverse to the axis of the shaft 23 and are disposed vertically below the cam 25. The extension 39 has a vertical groove 41 parallel to its elongated dimension and disposed between its elongated sides, the extension 40 being similarly provided with a vertical groove 42. Cantilever beams 43 and 44 are disposed in the grooves 41 and 42 respectively, being secured therein as by screws 43a, and extend vertically upward to a point above the axis of the cam 25 of shaft 23. The beams 43 and 44 are provided each with two wire resistance strain gages arranged thereupon so as to measure bending of the beams 43 and 44 transverse to the axis of shaft 23. The beam 43 has gages 45 and 46 disposed on its inner and outer surfaces, respectively, and the beam 44 has gages 47 and 48 disposed on its inner and outer surfaces, respectively, the mounting of gages on both surfaces of the beams 43 and 44 providing temperature compensation in a well-known manner to be hereafter described.

The beams 43 and 44 are provided respectively with coaxial circular apertures 49 and 50, the axes of which are transverse to and horizontally aligned with the axis of shaft 23. Extending through and secured to the edges of the apertures 49 and 50 are cylindrical members 51 and 52 respectively, having enlarged cylindrical portions 53 and 53a, respectively, positioned between the beams 43 and 44 and opposite sides of the cam 25. A U-shaped retention spring 54 engages the outer end of each of cylindrical spring retainers 53c and 53d which are pressed on the cylindrical members 51 and 52 respectively, the spring 54 having inwardly directed pointed members 54a. The spring 54 is employed to maintain the portions 53 and 53a of members 51 and 52 in firm contact with the cam 25 during rotation of the cam.

The points of contact between members 53 and 53a and the cam 25 lie in a horizontal plane passing through the axis of the cam 25 and perpendicular to the direction of displacement of the axis of cam 25 from the axis of sections 24 and 26 of shaft 23. Therefore, the members 53 and 53a contact areas on the surface of the cam 25 displaced equally from the axis of rotation of the shaft 23, when shaft 23 is in its reference position. These equal distance areas lie halfway between the areas on the cam having the maximum and minimum displacement from the axis of the shaft 23 and therefore clockwise rotation of the shaft 23 as seen in Figure 4 causes the member 53a to succesively engage areas on the cam 25 having increased displacement from the axis of the shaft 23. As a result the beam 44 is bent toward the right in Figure 4. Concurrently the member 53 successively engages areas on the cam 25 having decreasing displacement from the axis of shaft 23 and the beam 43 is also bent to the right in Figure 4. Upon counterclockwise rotation of the shaft 23, the beams 43 and 44 engage respective areas on the cam having increasing and decreasing displacement from the axis of the shaft 23, and the beams 43 and 44 are simultaneously bent to the left, as seen in Figure 4.

Leads 56 of the strain gages 45–48 are brought out to terminals 57 secured to, but electrically isolated from base member 38, the terminals 57 being located between the vertical extensions 39 and 40. A multiconductor cable 58 has various conductors connected to the terminals 57 and extends through an aperture 59 in the side wall 6 to an appropriate measuring or recording instrument 62.

Referring to Figure 5 of the accompanying drawings the gages 45–48 are arranged in a Wheatstone bridge 60 supplied with direct current over leads 61. The gages 45 and 48 are connected in series between leads 61 to form two arms of the bridge 61, gages 46 and 47 are also connected between leads 61 to form the other two arms of the bridge 61. A meter 62 and limiting resistor 63 are connected in series between the conjugate terminals of the bridge 60. Connected in series between leads 61 are fixed resistors 64 and 65 and the variable resistor 66 having a variable tap 67, the resistor 66 being positioned between resistors 64 and 65. The tap 67 is connected to the conjugate terminal of the bridge 60, between gages 46 and 47, and the bridge may be initially balanced by varying the position of the tap 67 on resistor 66 until the meter 62 reads zero.

The arrangement of the gages 45–48 in the bridge 60, as described, eliminates variations in output voltage from the bridge 60 with variations in stress in the beams 43 and 44 resulting from temperature changes thereof. If the temperature of the beams 43 and 44 increases, thereby increasing their length, all of the gages 45–48 have their resistances increased by substantially the same amount and the bridge 60 remains balanced. Although errors in the output voltage of the bridge 60 resulting from temperature variable stresses in the beams 43 and 44 may be eliminated, substantial temperature errors may be introduced into the apparatus as a result of temperature variations of the spring 54.

If the plane of points of contact between the spring 54 and the members 51 and 52 is located above or below the axis of the cam 25 the beams 43 and 44 are pre-stressed as a result of torque developed by the force applied by the spring 54 acting through a lever arm equal to the displacement of this plane from the axis of the cam 25. Changes in the temperature of the spring 54 produce variations in the force it applies to the beams 43 and 44, thereby varying the pre-stressing of the beams independently of the position of the shaft 23. It is apparent that such variations in stress of the beams 43 and 44 introduce uncompensated errors into the shaft position indications provided by the transducer. Pre-stressing of the beams 43 and 44 may be eliminated when the shaft 23 is in its reference position by aligning the plane of contact between the spring 54 and members 51 and 52 with the axis of the cam 25. Upon rotation of the shaft 23 the axis of the cam is shifted with respect to this plane and a lever arm is developed which is a function of the degree of rotation of the shaft 23, reaching a maximum equal to the diameter of the circle described by the axis of cam 25 about the axis of shaft 23 when the shaft 23 is rotated 180 degrees. Temperature variations of the spring 54 then have an undesirable and unpredictable effect upon the indication provided by the transducer. In accordance with the present invention the plane of the points of contact between spring 54 and members 51 and 52 passes through the axis of the shaft 23. A lever arm is developed equal to the displacement of the axis of the cam 25 from the axis of the shaft 23, this displacement also being equal to the radius of the circle described by rotation of the axis of the cam 25 about the axis of the shaft 23. This is the largest lever arm that can be developed regardless of the position of shaft 23 since upon rotation of shaft 23 the lever arm decreases as a function of rotation of the shaft 23 becoming zero when the shaft 23 is rotated 90 degrees and becoming equal to its initial length when the shaft is rotated 180 degrees. Any other positioning of the plane of points of contacts between spring 54 and members 51 and 52 produces a larger lever arm at some rotational angle of the shaft 23. Since electrical resistance strain gages which are highly sensitive to stress are employed, the offset of the axis of cam 25 from the axis of shaft 23 may be maintained quite small, thereby minimizing the pre-stressing of the beams 43 and 44. Minimizing pre-stressing of the beams 43 and 44 and temperature compensation of the beams 43 and 44 by properly arranging the strain gages 45 to 48 in the bridge 60, provides a transducer which is substantially free of inaccuracies resulting from variations in temperature of its various components.

In operation of the device of the present invention, rotation of the shaft 23, and therefore cam 25, in a clockwise direction, for instance, as seen in Figure 4, bends the beam 44 to the right by an amount proportional to the degree of rotation of shaft 23, the beam 43 being retained in contact with cam 25 by the spring 54 and therefore also being bent toward the right. Bending of the beams 43 and 44 to the right subjects the strain gages 45 and 48 to compressive forces thereby increasing their resistance. The decreases and increases of resistance of the gages 46, 48 and 45, 47 respectively, have a cumulative effect due to their arrangement in the bridge and the voltage at the junction of gages 45 and 48 becomes, for instance, positive with respect to the voltage at the junction of the gages 46 and 47 by an amount proportional to rotation of the shaft 23. If the shaft 23 is rotated in the opposite direction, i.e., counterclockwise the above conditions are reversed and the voltage at the junction of gages 46 and 47 becomes positive with respect to the voltage of the junction of gages 45 and 48. Thus the polarity of the voltage across the meter 62 (see Figure 6) is dependent upon the direction of rotation of the shaft 23 from its initial or reference position and the magnitude of the voltage is proportional to the extent of rotation.

Figure 6:
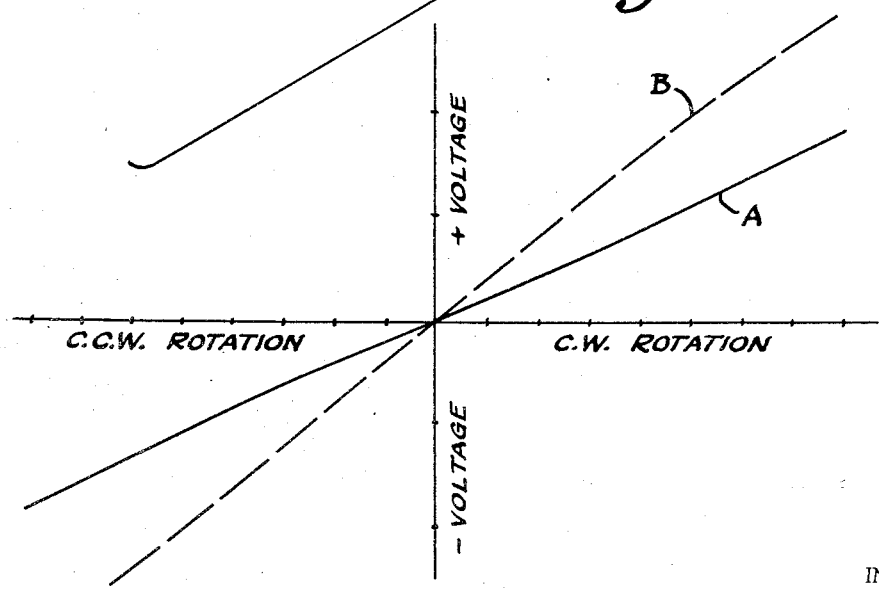
Figure 6 is a graph showing the response of the shaft position indicator to shaft rotation.

Referring further to the graph of Figure 6 of the accompanying drawings the curve A is a plot of shaft rotation versus output voltage for a shaft position transducer constructed in accordance with the present invention. Curve B is a plot of shaft rotation versus output voltage of the shaft position transducer when the plane of the points of contact between spring 54 and beams 43 and 44 is displaced above the axis of the shaft 23 by twice the displacement of the axis of cam 25 above the axis of the shaft 23 as illustrated in Keene Patent No. 2,712,645. It may be observed from curve B that the pre-stressing of beams 43 and 44 in the latter case is sufficiently large to introduce a substantial non-linearity into the response of the transducer. Reference to the curve A indicates clearly that transducers constructed in accordance with the present invention have substantially linear response to shaft rotation.

While I have described and illustrated one specific example of the present invention it will be clear that variations of the specific details of construction may be resorted to without departing from the true spirit of the invention as defined in the appended claims.

What I claim is:

1. A shaft position transducer comprising a shaft rotatable in either direction about its axis, said shaft including a cam having an axis about which said cam is symmetrical, said axis being parallel to the axis of said shaft, detent means for establishing a reference position for said shaft wherein the axis of said cam is displaced from the axis of said shaft in a first coordinate direction, a first and a second cantilever beam, said beams contacting said cam at substantially diametrically opposed points on the surface of said cam, the points of contact between said beams and said cam lying in a plane perpendicular to said first coordinate direction when said shaft is in its reference position, a spring for applying a force to each of said beams to maintain said beams in contact with said cam, said spring contacting said beams along an axis perpendicular to said first coordinate direction and passing through the center of said shaft and means for measuring the deflection of said beams.

2. A shaft position transducer comprising a cylindrical shaft rotatable in either direction about its axis, said cylindrical shaft including a cam having an axis about which said cam is symmetrical, said axis being parallel to the axis of said shaft, a detent means secured to said shaft for returning said shaft to a reference position upon external torque being removed from said shaft, the reference position established by said detent means being such that the axis of said cam is displaced from the axis of said shaft in a first coordinate direction, a first and a second cantilever beam, said beams contacting said cam at substantially diametrically opposed points on the surface of said cam, the points of contact between said beams and said cam lying in a plane perpendicular to said first coordinate direction when said shaft is in its reference position, a spring for applying a force to each of said beams to maintain said beams in contact with said cam, said spring contacting the beams along an axis perpendicular to said first coordinate direction and passing through the center of said shaft, said spring directing substantially all of its force along said axis and means for measuring the deflection of said beams.

References Cited in the file of this patent

UNITED STATES PATENTS

| | | |
|---|---|---|
| 2,321,322 | Ruge | June 8, 1943 |
| 2,334,671 | Gibbons | Nov. 16, 1943 |
| 2,597,751 | Ruge | May 20, 1952 |
| 2,712,645 | Keene | July 5, 1955 |

FOREIGN PATENTS

| | | |
|---|---|---|
| 637,069 | Germany | Oct. 20, 1936 |